United States Patent
Bai et al.

(10) Patent No.: US 10,185,925 B2
(45) Date of Patent: Jan. 22, 2019

(54) GENERATING BUSINESS RULE MODEL

(71) Applicant: International Business Machines Corporation, Armonk, NY (US)

(72) Inventors: Yue Bai, Beijing (CN); Xu Ming Chen, Beijing (CN); Yan Jun Huang, Beijing (CN); Yun Li Li, Beijing (CN); Jian Min Liu, Beijing (CN); Ying Liu, Beijing (CN); Ling Ling Lu, Beijing (CN); Jian Qin, Beijing (CN); Xi Ning Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 524 days.

(21) Appl. No.: 14/706,630

(22) Filed: May 7, 2015

(65) Prior Publication Data
US 2015/0371159 A1 Dec. 24, 2015

(30) Foreign Application Priority Data
Jun. 18, 2014 (CN) .......................... 2014 1 0273115

(51) Int. Cl.
*G06Q 10/06* (2012.01)
*G06N 5/02* (2006.01)

(52) U.S. Cl.
CPC ..... *G06Q 10/067* (2013.01); *G06Q 10/06316* (2013.01); *G06N 5/025* (2013.01)

(58) Field of Classification Search
CPC ......... G06Q 10/00; G06Q 40/00; G06F 17/60
(Continued)

(56) References Cited

U.S. PATENT DOCUMENTS 8,099,376 B2 * 1/2012 Serrano-Morales ... G06N 5/025
706/47

8,522,195 B2 * 8/2013 Miloslavsky ............. G06F 8/10
717/104
(Continued)

FOREIGN PATENT DOCUMENTS

WO WO2007122640 A2 11/2007

OTHER PUBLICATIONS

Ian "Business Rule Model", Database Design and Development, p. 1. (Year: 2011).*
Almonaies et al., "Legacy System Evolution towards Service-Oriented Architecture," International Workshop on SOA Migration and Evolution, Mar. 2010, pp. 53-62.
(Continued)

*Primary Examiner* — Romain Jeanty
(74) *Attorney, Agent, or Firm* — Yee & Associates, P.C.; David Woycechowsky

(57) ABSTRACT

A method, apparatus and program product for generating a business rule model. In one embodiment, there is provided a method for generating a business rule model, comprising: extracting from source code of an application system a business flow executed by the source code, the business flow comprising a plurality of business procedures that are executed in an order; analyzing parts in the source code that are associated with various business procedures among the plurality of business procedures, building rule metadata describing business rules followed by various business procedures; and generating a business rule model followed by the business flow on the basis of the order and the rule metadata. In one embodiment of the present invention, there is provided an apparatus for generating a business rule model. Accordingly, a business rule model may be automatically generated from source code of an application system without manual manipulation.

15 Claims, 7 Drawing Sheets

(58) Field of Classification Search
USPC .......................................................... 705/7.26
See application file for complete search history.

(56) References Cited

U.S. PATENT DOCUMENTS

| | | | |
|---|---|---|---|
| 8,726,286 B2* | 5/2014 | Gururaja | G06Q 10/0631 |
| | | | 718/102 |
| 9,245,244 B2* | 1/2016 | Thomas | G06Q 10/06 |
| 9,729,615 B2* | 8/2017 | Nair | H04L 67/10 |
| 2007/0067756 A1 | 3/2007 | Garza | |
| 2008/0163159 A1 | 7/2008 | Oara et al. | |
| 2014/0351023 A1* | 11/2014 | Rallapalli | G06Q 10/067 |
| | | | 705/7.36 |

OTHER PUBLICATIONS

Chaparro et al., "Towards the Automatic Extraction of Structural Business Rules from Legacy Databases," 19th Working Conference on Reverse Engineering (WCRE), Oct. 2012, pp. 479-488.

"Legacy Forensics: The Business Case, Challenges and Solution for Reducing Risk in Legacy Environments," BluePhoenix Solutions, copyright 2014, 15 pages.

Kilner, "Recovering Business Rules and Data Models," Databorough, copyright 2012, 24 pages.

Putrycz et al., "Recovering Business Rules from Legacy Source Code for System Modernization," Lecture Notes in Computer Science vol. 4824: Advances in Rule Interchange and Applications, International Symposium, (RuleML-2007), Oct. 2007, pp. 107-118.

* cited by examiner

```
PROCEDURE DIVISION.
MAIN-LOGIC.
   PERFORM VALIDATION-MAXIMUMAGEREQ.
   PERFORM VALIDATION-MAXIMUMAMOUNT.
VALIDATION-MAXIMUMAGEREQ.
   IF AGE OF BORROWER > 65                    210
      MOVE STRTEMP OF LOCALAREA1 TO STRTEMP1 OF LOCALAREA1
         PERFORM MAPPED-METHOD1
         PERFORM MAPPED-METHOD2
   END-IF.
VALIDATION-MAXIMUMAMOUNT.
   IF AMOUNT OF LOAN > 1000000                220
      MOVE STRTEMP2 OF LOCALAREA1 TO STRTEMP1 OF LOCALAREA1
      PERFORM MAPPED-METHOD1
      PERFORM MAPPED-METHOD2
   END-IF.
```

GENERATING BUSINESS RULE MODEL

CROSS-REFERENCE TO RELATED APPLICATION(S)

This application claims the benefit of priority to Chinese Patent Application No. 201410273115.8, filed Jun. 18, 2014, the entire contents of which are incorporated herein by reference.

FIELD

Various embodiments of the present invention relate to data processing, and more specifically, to a method and apparatus for generating a business rule model from a legacy application system.

BACKGROUND

With the development of computer technology, the development of application systems has undergone various changes. In an early developed application system, a control rule for controlling the business flow is closely coupled to source code (e.g., embedded into source code); as a result, after the application system is developed, the control rule cannot be modified flexibly, and in turn the flexibility of the application system is rather poor. In addition, the development of computer technology promotes the evolution of programming languages. Most of early programming languages (such as COBOL, C, etc.) adopt a procedure-oriented programming model, whereas in recent years' popular programming languages (such as C++, Java, etc.) all adopt an object-oriented programming model.

In industries like electric power, finance and so on, there exist a large amount of legacy application systems developed using early programming languages, and these legacy application systems already become a core system in various industries. Techniques of legacy application systems are out of date and are gradually replaced by new techniques (such as the object-oriented programming model) and new platforms (cloud environment). Thereby, it becomes a focus of attention as to how to achieve modernization with respect to an early developed application system where the control rule is closely coupled to source code.

During modernization, first of all a knowledge of various business procedures of the legacy application system need to be understood; then, a business rule involved in various business procedures is analyzed; and later, the modernization of the legacy application system is achieved on the basis of the business rule. Existing technical solutions usually require technicians with rich programming experience to manually read source code of the legacy application system and further obtain a relevant business rule. On the one hand, huge manpower, material resources and time overheads are needed; on the other hand, with the rapid development of programming languages, technicians who are proficient in early programming languages (such as COBOL) can hardly be found now.

Therefore, how to generate a business rule model from source code of a legacy application system without manual manipulation is a key issue confronting the application system modernization.

SUMMARY

Therefore, it is desired to develop a technical solution capable of automatically generating a business rule model from source code of a legacy application system, and it is desired that the generated business rule model may comprise various rules followed by a business flow executed by the source code so that the legacy application system can be modernized on the basis of the business rule model in subsequent processing.

According to one aspect of the present invention, there is provided a method for generating a business rule model, comprising: extracting from source code of an application system a business flow executed by the source code, the business flow comprising a plurality of business procedures that are executed in an order; analyzing parts in the source code that are associated with various business procedures among the plurality of business procedures, building rule metadata describing business rules followed by various business procedures; and generating a business rule model followed by the business flow on the basis of the order and the rule metadata.

In one embodiment of the present invention, the analyzing parts in the source code that are associated with various business procedures among the plurality of business procedures and building rule metadata describing business rules followed by various business procedures comprises: with respect to parts in the source code that are associated with various business procedures among the plurality of business procedures, building the rule metadata on the basis of a mapping relationship between a data structure referenced by the source code and a business term in the business flow.

According to another aspect of the present invention, there is provided an apparatus for generating a business rule model, comprising: an extracting module configured to extract from source code of an application system a business flow executed by the source code, the business flow comprising a plurality of business procedures that are executed in an order; a building module configured to analyze parts in the source code that are associated with various business procedures among the plurality of business procedures and build rule metadata describing business rules followed by various business procedures; and a generating module configured to generate a business rule model followed by the business flow on the basis of the order and the rule metadata.

In one embodiment of the present invention, the building module comprises: a first building module configured to, with respect to parts in the source code that are associated with various business procedures among the plurality of business procedures, build the rule metadata on the basis of a mapping relationship between a data structure referenced by the source code and a business term in the business flow.

By means of the method and apparatus of the present invention, a business rule model may be automatically generated from source code of an application system without manual intervention. Further, whether there are conflicts in the source code may be validated using the generated business model. Still further, the legacy application system may move to a new application environment on the basis of the generated business rule model.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 2 schematically shows a segment of source code of a legacy application system according to one technical solution;

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
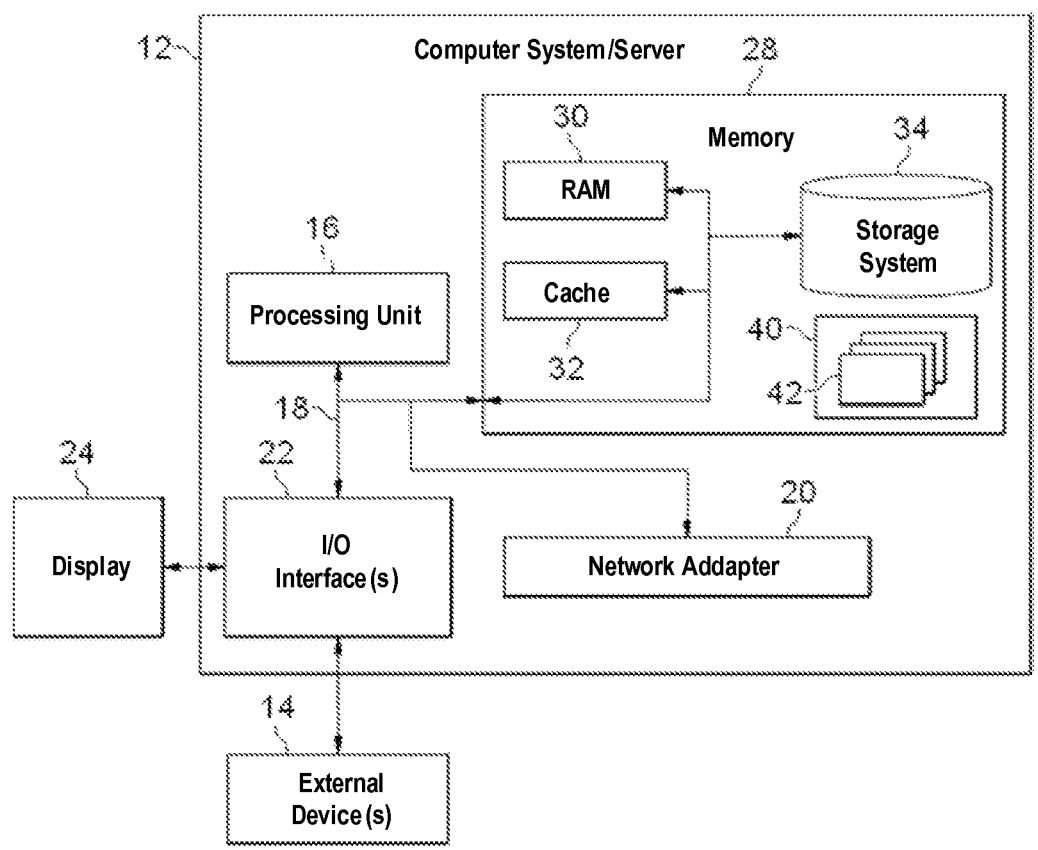
FIG. 1 schematically shows an exemplary computer system/server 12 which is applicable to implement the embodiments of the present invention.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Illustration is presented below to how to generate a business rule model by means of a concrete example of the legacy application system. Since the COBOL language has stronger stability, most of early application systems are developed using COBOL in industries like finance, electric power and so on. In the context of the present invention, illustration is presented to how to implement the technical solution of the present invention only by taking a banking application system developed using COBOL as a concrete example. However, those skilled in the art should understand the technical solution is neither limited to banking application systems nor limited to be developed in COBOL, but can be applied to systems in a wide range of industries and developed in various languages.

To show the technical solution of the present invention more clearly, first of all illustration is presented to meaning of technical terms involved throughout the context of the present invention.

A rule refers to a series of specific business conditions, policies, constraints or requirements of dependency relationships. Specifically, among bank daily operations, one example of rules may be a rule on calculating loan interest rates for users, and this rule may involve various aspects, for example, the load interest rate may be associated with factors such as the age of a borrower, the loan amount and the like. Another example of rules may be a rule on calculating transfer fees, and this rule may involve aspects such as product, customer, geographic location and the like.

Due to the complexity of business, a plurality of associated rules may be involved during executing a business flow, and thus the present invention further involves a concept of rule group. A rule group refers to a set consisting of to-be-executed rules. When executing a rule group, various rules in the rule group should be executed in a specified order.

A rule flow is a control mode of rule execution, including which rules (groups) are to be executed and in what order rules (groups) are executed. These rules (groups) are executed successively, and each rule flow has one start and at least one end.

FIG. 2 schematically shows a segment 200 of source code of a legacy application system according to one technical solution. The source code segment shown in FIG. 2 implements a business flow of calculating rates of interest collected from borrowers, and in the business flow interest rates are calculated on the basis of the age of a borrower and the loan amount. The source code segment shown in FIG. 2 is written on the basis of COBOL, and in this source code segment, two "IF" statements denoted by reference numerals 210 and 220 correspond to two business rules in the business flow, respectively.

The "IF" statement denoted by reference numeral 210 is for judging whether the age of a borrower is greater than "65," and different steps are executed on the basis of a judgment result; the "IF" statement denoted by reference numeral 220 is for judging whether the loan amount is greater than "1000000" yuan, and different steps are executed on the basis of a judgment result. In the source code segment shown in FIG. 2, business rules for calculating loan rates (such as judgment conditions "65" and "1000000" of the IF statements) are embedded into the source code. However, with the modernization of the banking application system and the change of banking loan rules, it is desired to separate the business rules from the source code, and further it is desired to modify the business rules without a need to recompile the source code. For example, it is desired to conveniently modify the judgment condition of the age of a borrower as "60," etc.

Although there have been proposed technical solutions for obtaining business rules by searching for judgment statements like "IF" statements in source code of a legacy application system, these technical solutions can only find potential code segments associated with business rules, and later the found code segments need to be analyzed manually so as to obtain business rules. In addition, these technical solutions cannot obtain a relationship between the found code segments, not to mention a relationship between business rules corresponding to found code segments.

Figure 3:
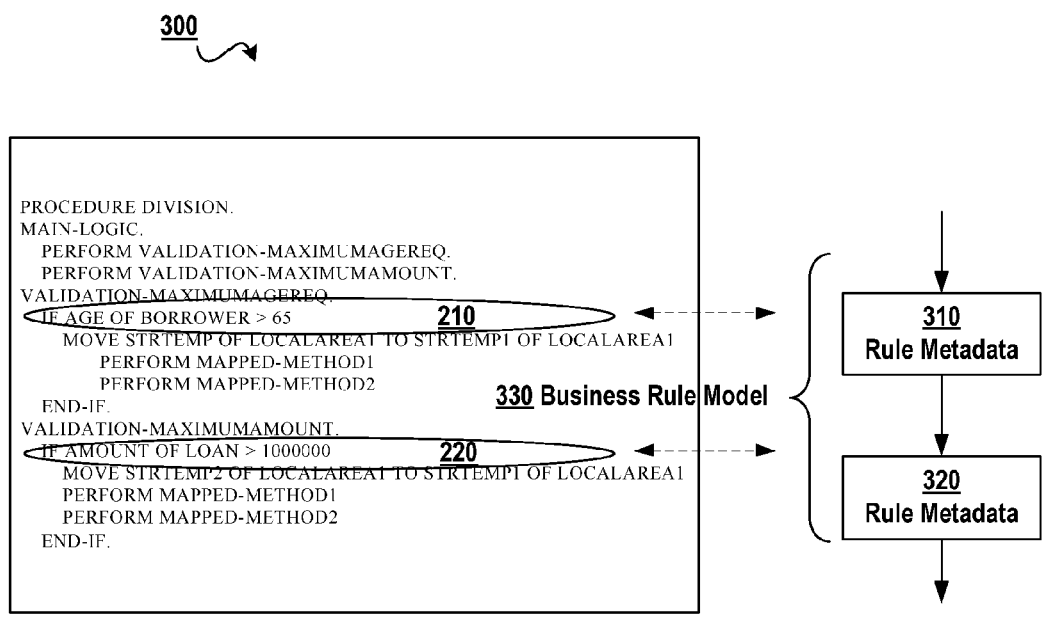
FIG. 3 schematically shows a block diagram of a technical solution for generating a business rule model according to one embodiment of the present invention.

In view of drawbacks in the prior art, the present invention provides a technical solution for generating a business rule model. FIG. 3 schematically shows a block diagram 300 of a technical solution for generating a business rule model according to one embodiment of the present invention. As shown in this figure, using the technical solution of the present invention, a business flow executed by source code may be obtained by analyzing the calling of various procedures (such as PERFORM VALIDATION-MAXIMUMMAGEREQ, PERFORM VALIDATION-MAXIMUMA-MOUNT, etc.) by a main program (such as MAIN-LOGIC) of source code of an application system.

Next, metadata of business rules followed by various business flows may be built by analyzing the source code of various business flows. For example, rule metadata 310 may correspond to source code 210, and rule metadata 320 may correspond to source code 220.

Subsequently, a business rule model 330 may be generated on the basis of an execution order among various business procedures in business flows. Business rule model 330 may comprise rules (such as rule metadata 310 and rule metadata 320) followed by source code segments, as well as an execution order among various rules (as shown by an arrow between rule metadata 310 and 320). Thereby, a business rule model followed by a business flow associated with source code of an application system may be generated from the source code.

Specifically, in one embodiment of the present invention there is provided a method for generating a business rule model, comprising: extracting from source code of an application system a business flow executed by the source code, the business flow comprising a plurality of business procedures that are executed in an order; analyzing parts in the source code that are associated with various business procedures among the plurality of business procedures, building rule metadata describing business rules followed by various business procedures; and generating a business rule model followed by the business flow on the basis of the order and the rule metadata.

Figure 4:
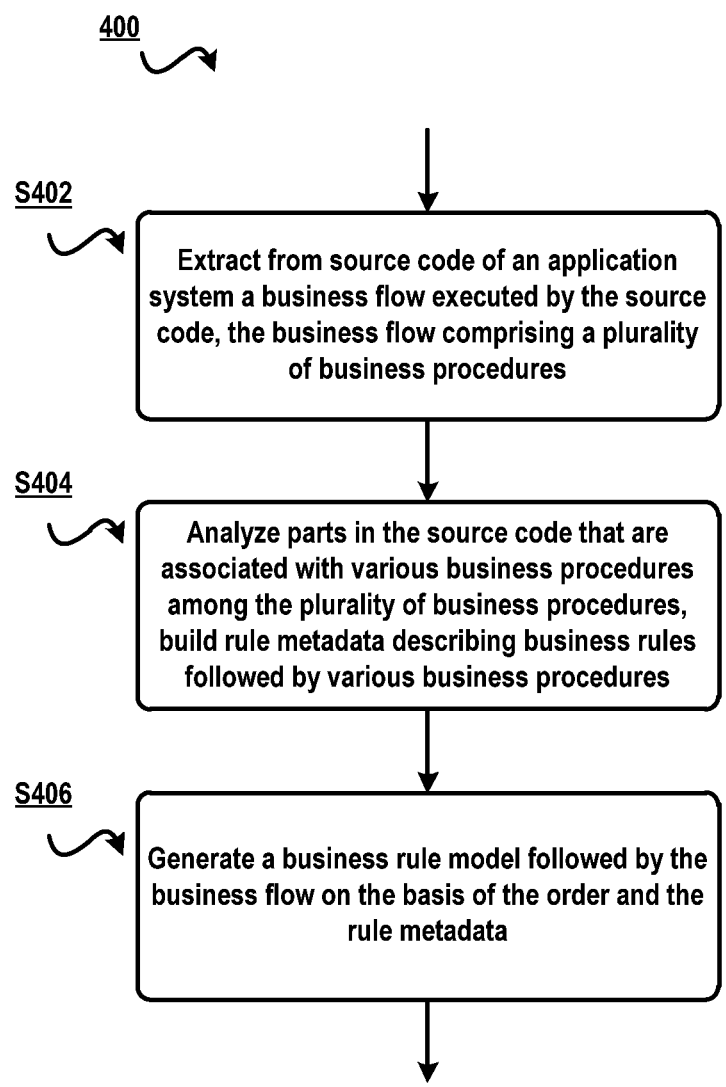
FIG. 4 schematically shows a flowchart of a method for generating a business rule model according to one embodiment of the present invention.

FIG. 4 schematically shows a flowchart 400 of a method for generating a business rule model according to one embodiment of the present invention. In step S402, a business flow executed by source code of an application system is extracted from the source code, the business flow comprising a plurality of business procedures that are executed in an order. Early programming languages are usually procedure-oriented languages, so a business flow may be obtained by analyzing the calling of various procedures by a main program in source code of an application system. The business flow may comprise a plurality of business procedures that are executed in order. For example, regarding an example of source code as shown in FIG. 3, the business flow may comprise two business procedures represented as VALIDATION-MAXIMUMMAGEREQ and VALIDATION-MAXIMUMAMOUNT. Where the source code involves a plurality of files, a relevant business flow may be looked up in a corresponding file on the basis of the calling by a main program.

In step S404, parts in the source code that are associated with various business procedures among the plurality of business procedures are analyzed and rule metadata of business rules followed by various business procedures is built. In this step, source code associated with VALIDATION-MAXIMUMMAGEREQ and VALIDATION-MAXIMUMAMOUNT may be analyzed respectively, and rule metadata describing business rules followed by business procedures corresponding to VALIDATION-MAXIMUMMAGEREQ and VALIDATION-MAXIMUMAMOUNT is built.

Specifically, VALIDATION-MAXIMUMMAGEREQ needs to satisfy "IF" statement 210 as shown in FIG. 3, and VALIDATION-MAXIMUMAMOUNT needs to satisfy "IF" statement 220 as shown in FIG. 3. Those skilled in the art may define a format of rule metadata, so long as the format can describe the meaning of a business rule associated with a conditional statement in source code.

In step S406, a business rule model followed by the business flow is generated on the basis of the order and the rule metadata. Since the execution order among various business procedures in the business flow and rule metadata associated with various business procedures have been learned, various rule metadata may be "assembled" according to the execution order, so as to generate a business rule model followed by the business flow. Those skilled in the art may define a data format of the business rule model. For example, the business rule model may be stored using the flowchart as shown in FIG. 3, on the basis of XML language or using other approach.

With reference to the source code segment shown in FIG. 3, illustration has been presented above to brief steps of a method for generating a business rule model. Hereinafter, further illustration is presented to other details for generating a business rule model with reference to a source code segment (as shown in Table 1 below) for calculating transfer fees in a banking application system.

TABLE 1

Source Code Segment for Calculating Transfer Fees

```
****************************************************************
    PROCEDURE DIVISION USING AIF-AREA
               PCCMIRTA
               SYS-AREA.
****************************************************************
0000-MAIN-PROCESS-RTN.
    PERFORM 1000-SUB-LOGIC.
    PERFORM 1001-SUB-LOGIC.
    PERFORM 2000-SUB-LOGIC.
    PERFORM 2001-SUB-LOGIC.
    PERFORM 3000-SUB-LOGIC.
    GOBACK.
1000-SUB-LOGIC.
    IF I-PRDTYP OF PCCMIRTA = 'CURRENT'
    THEN
        MOVE '100'      TO CMFERAT1 OF PCCMFEEA
    END-IF.
1001-SUB-LOGIC.
    IF I-PRDTYP OF PCCMIRTA = 'FIXED-TERM'
    THEN
        MOVE '99'       TO CMFERAT1 OF PCCMFEEA
    END-IF.
2000-SUB-LOGIC.
    IF I-CUSTYP OF PCCMIRTA = 'PERSONAL' AND I-CUSLEV OF
PCCMIRTA = COMMON'
    THEN
        MOVE '100'      TO CMFERAT2 OF PCCMFEEA
    END-IF.
2001-SUB-LOGIC.
    IF I-CUSTYP OF PCCMIRTA = 'PERSONAL' AND I-CUSLEV OF
PCCMIRTA = 'VIP'
    THEN
        MOVE '99'       TO CMFERAT2 OF PCCMFEEA
    END-IF.
3000-SUB-LOGIC.
    IF I-FROMLOCA OF PCCMIRTA = I-TOLOCA OF PCCMIRTA
    THEN
        MOVE '0'        TO CMFERAT3 OF PCCMFEEA
    ELSE
        MOVE '5'        TO CMFERAT3 OF PCCMFEEA
    END-IF.
```

In the source code segment shown in Table 1 above, when calculating transfer fees, information in three respects need to be considered: 1) product dimension, i.e., the user transfers from which product (current product/fixed-term product); 2) customer dimension, i.e., the user belongs to which type of customers (personal, common customer/personal, VIP customer); and 3) location dimension, i.e., whether the remitting bank's location is the same as the receiving bank's location (local/long-distance). With reference to the source code shown in Table 1 above, description is presented to more details of the embodiments of the present invention.

In one embodiment of the present invention, the extracting from source code of an application system a business flow executed by the source code comprises: extracting the business flow on the basis of logic procedures in the source code and an execution order among the logic procedures, wherein a business procedure in the business flow corresponds to a logic procedure in the source code.

The source code may be analyzed line by line, so as to obtain logic procedures in the source code and an execution order among the logic procedures. Specifically, in the source code shown in Table 1 above, a main logic procedure "0000-MAIN-PROCESS-RTN" comprises a plurality of logic procedures "1000-SUB-LOGIC," "1001-SUB-LOGIC," . . . , and "3000-SUB-LOGIC." At this point, the business flow may be extracted on the basis of the plurality of logic procedures. Specifically, the logic procedure "1000-SUB-LOGIC" corresponds to a business procedure that is to be executed when the product dimension is "current," the logic procedure "1001-SUB-LOGIC" corresponds to a business procedure that is to be executed when the product dimension is "fixed-term," etc. In this manner, a business flow executed by source code of an application system may be extracted from the source code.

In one embodiment of the present invention, the analyzing parts in the source code that are associated with various business procedures among the plurality of business procedures and building rule metadata describing business rules followed by various business procedures comprises: with respect to parts in the source code that are associated with various business procedures among the plurality of business procedures, building the rule metadata on the basis of a mapping relationship between a data structure referenced by the source code and a business term in the business flow.

The procedure of developing an application system is a procedure of describing a business flow in a programming language (such as COBOL), so there is a mapping relationship between a data structure referenced in the source code and a business term in the business flow. On the basis of the mapping relationship therebetween, it can be learned clearly to which business term a data structure in the source code corresponds, and further a connection between the source code and the business rule can be built on the basis of such a mapping relationship.

Table 2 below schematically illustrates the definition of a data structure referenced by the source code shown in Table 1. In the COBOL language, the data structure may be defined in a "COPYBOOK" file; when a user uses other programming language, the data structure being used may be defined in other type of file (for example, the data structure may be defined in an ".h" file in the C language).

TABLE 2

Example of COPYBOOK File

```
*@SEMANTIC(/MODEL/product/type)
       02 I-PRDTYP       PIC X(9).
*@SEMANTIC(/MODEL/customer/type)
       02 I-CUSTYP       PIC X(9).
*@SEMANTIC(/MODEL/customer/level)
       02 I-CUSLEV       PIC X(9).
*@SEMANTIC(/MODEL/location/source)
       02 I-FROMLOCA     PIC X(9).
*@SEMANTIC(/MODEL/location/destination)
       02 I-TOLOCA       PIC X(9).
*@SEMANTIC(/MODEL/fee/rate/product)
       02 CMFERAT1       PIC S9(13)V9(2) COMP-3.
```

TABLE 2-continued

Example of COPYBOOK File

```
*@SEMANTIC(/MODEL/fee/rate/customer)
        02 CMFERAT2        PIC S9(13)V9(2) COMP-3.
*@SEMANTIC(/MODEL/fee/rate/location)
        02 CMFERAT3        PIC S9(13)V9(2) COMP-3.
```

In the COPYBOOK file shown in Table 2 above, "02 I-PRDTYP PIC X(9)" represents the definition of a data structure in the source code, and "*@SEMANTIC(/MODEL/product/type)" represents a business term corresponding to the data structure. Specifically, "I-PRDTYP" may be mapped to the business term "product/type" in the business procedure, i.e., represents the meaning of product type. For another example, "02 I-CUSTYP PIC X(9)" and "customer/type" have a mapping relationship between them, i.e., represent the customer type. For another example, "02 CMFERAT1 PIC S9(13)V9(2) COMP-3" and "/fee/rate/product" have a mapping relationship, i.e., represent the customer dimension fee coupon. For another example, "02 I-CUSLEV PIC X(9)" and "customer/level" have a mapping relationship, i.e., represent the customer level, etc.

On the basis of the source code shown in Table 1 and the mapping relationships shown in Table 2, a framework of the business rule model may be built, as shown in Table 3 below.

TABLE 3

Framework of Business Rule Model

```
<MODEL>
    <product>
        <type>
        product type
        </type>
    </product>
    <customer>
        <type>
        customer type
        </type>
        <level>
        customer level
        </level>
    </customer>
    <location>
        <source>
        location of remitting bank
        </source>
        <destination>
        location of receiving bank
        </destination>
    </location>
    <fee>
        <rate>
            <product>
            product dimension fee coupon
            </product>
            <customer>
            customer dimension fee coupon
            </customer>
            <location>
            local/long-distance dimension fee coupon
            </location>
        </rate>
    </fee>
</MODEL>
```

Those skilled in the art may define a data structure of rule metadata by analyzing source code associated with various business procedures on the basis of the framework of the model shown in Table 3. Specifically, now that it is learned on the basis of COPYBOOK that "I-PRDTYP" corresponds to the customer type, metadata may be built from a source code segment as shown in Table 4 below.

TABLE 4

Source Code Segment

```
1000-SUB-LOGIC.
    IF I-PRDTYP OF PCCMIRTA = 'CURRENT'
    THEN
        MOVE '100'         TO CMFERAT1 OF PCCMFEEA
        END-IF.
```

The source code in Table 4 represents a rule as below: when the product type is "current," the product dimension fee coupon is 100%. Therefore, rule metadata as shown in Table 5 may be built with respect to the code shown in Table 4. Those skilled in the art may define a format of rule metadata, so long as the format can describe a rule. Similarly, other rule metadata may further be built with respect to other code.

TABLE 5

Example of Rule Metadata

```
<ActionRule>
    <definition><![CDATA[IF PRODUCT TYPE IS "CURRENT"
    THEN SET PRODUCT DIMENSION FEE COUPON AS
'100%';]]></definition>
    </ActionRule>
```

As an example of building rule metadata from source code's parts associated with various business procedures among a plurality of business procedures has been illustrated above, description is presented below to concrete operations that are performed when the plurality of business procedures have an association relationship among them. The application system usually has to satisfy complex business rules, and the plurality of business procedures have an association relationship, so business procedures having an association relationship need to be added to the same procedure group and rule metadata is built with respect to various business procedures in this procedure group.

In one embodiment of the present invention, the building the rule metadata on the basis of a mapping relationship between a data structure referenced by the source code and a business term in the business flow with respect to parts in the source code that are associated with various business procedures among the plurality of business procedures comprises: identifying an association relationship between the plurality of business procedures to divide the plurality of business procedures into at least one procedure group; and analyzing parts in the source code that are associated with various procedure groups of the at least one procedure group, and building rule metadata associated with the various procedure groups on the basis of the mapping relationship.

Figure 5:
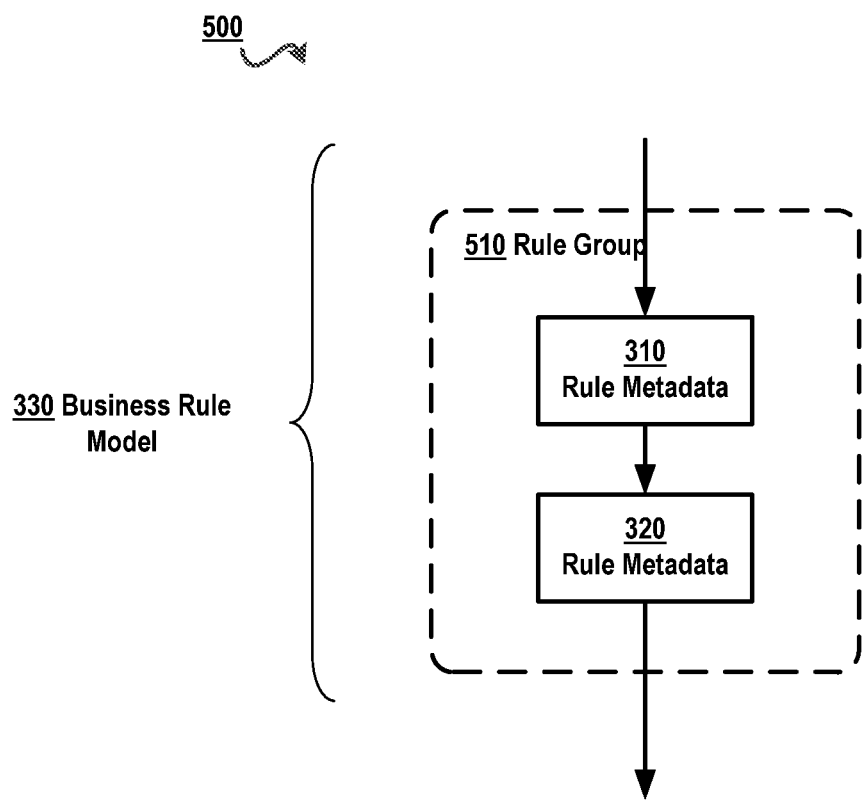
FIG. 5 schematically shows a block diagram of a business rule model comprising rule groups according to one embodiment of the present invention.

FIG. 5 schematically shows a block diagram 500 of a business rule model comprising rules according to one embodiment of the present invention. In this figure, for example rule metadata 310 and 320 come from two different business procedures, and these two business procedures have an association relationship between them, so at this point they may be added to the same procedure group. Accordingly, rule metadata 310 and 320 are also in the same rule group 510.

Specifically, in the source code shown in Table 1 above, both logic procedures "2000-SUB-LOGIC" and "2001-SUB-LOGIC" involve determining the customer dimension fee coupon on the basis of customer dimension (including customer type (I-CUSTYP) and customer level (I-CU- SLEV)), so two business procedures corresponding to the logic procedures "2000-SUB-LOGIC" and "2001-SUB-LOGIC" may be added to the same procedure group.

Figure 6:
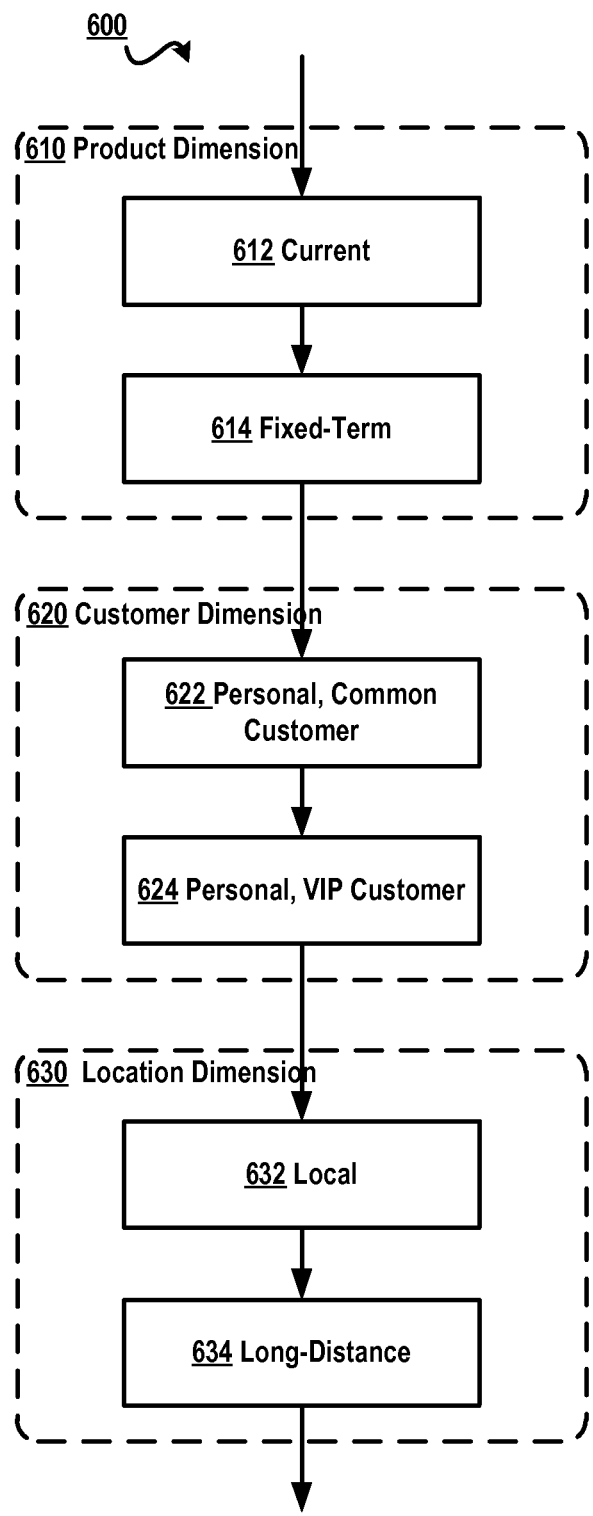
FIG. 6 schematically shows a block diagram of a business rule model according to one embodiment of the present invention.

In the source code shown in Table 1 above, calculating the transfer fee involves three respects: product dimension, customer dimension and location dimension, so business procedures may be divided into three business groups on the basis of these three dimensions. Specifically, FIG. 6 schematically shows a block diagram 600 of a business rule model according to one embodiment of the present invention. As shown in this figure, the business rule model may comprise three rule groups, namely a rule group 610 about product dimension, a rule group 620 about customer dimension, and a rule group 630 about location dimension. Further, rule group 610 about product dimension comprises two rules: a rule 612 that should be followed when the product is a current product, and a rule 614 that should be followed when the product is a fixed-term product. Rule group 620 about customer dimension comprises two rules: a rule 622 that should be followed when the customer is a personal common customer, and a rule 624 that should be followed when the customer is a personal VIP customer. Rule group 630 about location dimension may comprise two rules: a rule 632 that should followed when the remitting bank and the receiving bank are in the same city, and a rule 634 that should be followed when the remitting bank and the receiving bank are in different cities. By dividing business procedures into groups, business rules to be followed by various business procedures may be divided into corresponding rule groups, so a hierarchy relationship between rule metadata can be defined clearly.

In one embodiment of the present invention, the analyzing the parts in the source code that are associated with various procedure groups of the at least one procedure group and building rule metadata associated with the various procedure groups on the basis of the mapping relationship comprises: with respect to a current procedure group of the at least one procedure group, looking up an execution statement in a part of the source code corresponding to the current procedure group of the source code, so as to obtain a paragraph keyword; locating a code paragraph on the basis of the paragraph keyword; and parsing the code paragraph on the basis of a mapping relationship so as to obtain the rule metadata.

For source code written in COBOL, a "PERFORM" statement may be looked up in the source code, and a paragraph keyword may be obtained (e.g. "1000-SUB-LOGIC"), and subsequently a corresponding code paragraph may be found on the basis of "1000-SUB-LOGIC" for subsequent analysis.

In addition, those skilled in the art should note that nested calling may exist in the source code. For example, the logic procedure "1000-SUB-LOGIC" may call another logic procedure "1002-SUB-LOGIC" by a "PERFORM 1002-SUB-LOGIC" statement. At this point, similarly a paragraph keyword "1002-SUB-LOGIC" may be obtained by looking up the "PERFORM" statement.

In one embodiment of the present invention, the parsing the code paragraph on the basis of a mapping relationship so as to obtain the rule metadata comprises: obtain from the code paragraph a conditional statement and an action statement corresponding to the conditional statement; and in response to existence of the mapping relationship between the conditional statement and the business term, forming the rule metadata on the basis of the conditional statement and the action statement.

Note since a business rule in the business flow is typically expressed as a conditional statement in source code, a conditional statement may be looked up in a relevant code paragraph to obtain code possibly associated with a business rule. Specifically, in the source code written in COBOL, the conditional statement may be expressed "IF . . . THEN . . . ," so keywords "IF" and "THEN" may be looked up in a relevant code paragraph by text search.

In the context of the present invention, the statement following "THEN" may be referred to as an action statement, i.e. an action to be executed after satisfying a condition. At this point, if the conditional statement and the business term have a mapping relationship, then the rule metadata may be formed on the basis of the conditional statement and the action statement.

Specifically, when processing the source code segment shown in Table 4 above, if a conditional statement IF I-PRDTYP OF PCCMIRTA='CURRENT' and an action statement "MOVE '100' TO CMFERAT1 OF PCCMFEEA" are found, then the rule metadata as shown in Table 5 above may be built. The rule metadata means that if the product type is "current," then the product dimension fee coupon is set as 100%.

Similarly, those skilled in the art may further build other rule metadata by processing other source code segment. For example, continuing the above example, source code associated with the procedure group may be built and corresponding rule metadata built. For example, on the basis of source code (as shown in Table 6 below) associated with rule group about customer dimension, rule metadata may be built as shown in Table 7 below.

TABLE 6

Source Code Segment

2000-SUB-LOGIC.
  IF I-CUSTYP OF PCCMIRTA = 'PERSON' AND I-CUSLEV OF PCCMIRTA = 'COMMON'
  THEN
    MOVE '100'    TO CMFERAT2 OF PCCMFEEA
  END-IF.
2001-SUB-LOGIC.
  IF I-CUSTYP OF PCCMIRTA = 'PERSONAL' AND I-CUSLEV OF PCCMIRTA = 'VIP'
  THEN
    MOVE '99'    TO CMFERAT2 OF PCCMFEEA
  END-IF.

TABLE 7

Example of Rule Metadata

<DecisionTable>
  <Structure>
    <ConditionDefinitions>
      <ConditionDefinition Id="C0">
        <ExpressionDefinition>
          <Text><![CDATA[Customer Type]]></Text>
        </ExpressionDefinition>
      </ConditionDefinition>
      <ConditionDefinition Id="C1">
        <ExpressionDefinition>
          <Text><![CDATA[Customer Level]]></Text>
        </ExpressionDefinition>
      </ConditionDefinition>
    </ConditionDefinitions>
    <ActionDefinitions>
      <ActionDefinition Id="A1">
        <ExpressionDefinition>

TABLE 7-continued

Example of Rule Metadata

```
<Text><![CDATA[CustomerDimensionFeeCoupon]]></Text>
                        </ExpressionDefinition>
                    </ActionDefinition>
                </ActionDefinitions>
            </Structure>
            <Contents>
                <Partition DefId="p1">
                    <Condition>
                        <Expression>
<Param><![CDATA["Personal"]]></Param>
                        </Expression>
                        <Expression>
<Param><![CDATA["Common"]]></Param>
                        </Expression>
                    </Condition>
                    <ActionSet>
    <Action>
     <Expression>
      <Param><![CDATA[100%]]></Param>
     </Expression>
    </Action>
                    </ActionSet>
                </Partition>
                <Partition DefId="p2">
                    <Condition>
                        <Expression>
<Param><![CDATA["Personal"]]></Param>
                        </Expression>
                        <Expression>
<Param><![CDATA["VIP"]]></Param>
                        </Expression>
                    </Condition>
                    <ActionSet>
    <Action>
     <Expression>
      <Param><![CDATA[99%]]></Param>
     </Expression>
    </Action>
                    </ActionSet>
                </Partition>
            </Partition>
        </Contents>
    </DecisionTable>
```

Illustration has been presented above to how to generate rule metadata by means of examples. The framework of a business rule model shown in Table 3 above can be expanded using the rule metadata, so as to obtain a final business rule model. Specifically, after processing the source code as shown in Table 1, a business rule model may be generated as shown in Table 8 below.

TABLE 8

Business Rule Model

```
<Ruleflow>
    <Body>
        <StartTask Identifier="BusinessFlowStart"/>
        <RuleGroup ExecutionMode="RetePlus" ExitCriteria="None"
Identifier="ProductDimensionFeeCouponRuleGroup" Ordering="Default">
            <RuleList>
                <ActionRule>
                    <definition><![CDATA[IF PRODUCTTYPE =
"CURRENT"
                    THEN SET PRODUCT DIMENSION FEE
COUPON AS '100%' ;]]></definition>
                </ActionRule>
                <ActionRule>
                    <definition><![CDATA[IF PRODUCTTYPE =
"FIXED-TERM"
                    THEN SET PRODUCT DIMENSION FEE
COUPON AS '99%' ;]]></definition>
                </ActionRule>
            </RuleList>
        </RuleGroup>
        <RuleGroup ExecutionMode="RetePlus" ExitCriteria="None"
Identifier="CustomerDimensionFeeCouponRuleGroup" Ordering="Default">
            <RuleList>
                <DecisionTable>
                    <Structure>
                        <ConditionDefinitions>
                            <ConditionDefinition Id="C0">
                                <ExpressionDefinition>
<Text><![CDATA[CUSTOMERTYPE]]></Text>
                                </ExpressionDefinition>
                            </ConditionDefinition>
                            <ConditionDefinition Id="C1">
                                <ExpressionDefinition>
<Text><![CDATA[CUSTOMERLEVEL]]></Text>
                                </ExpressionDefinition>
                            </ConditionDefinition>
                        </ConditionDefinitions>
                        <ActionDefinitions>
                            <ActionDefinition Id="A1">
                                <ExpressionDefinition>
<Text><![CDATA[CUSTOMERDIMENSIONFEECOUPON]]></Text>
                                </ExpressionDefinition>
                            </ActionDefinition>
                        </ActionDefinitions>
                    </Structure>
```

TABLE 8-continued

Business Rule Model

```
                <Contents>
                    <Partition DefId="p1">
                        <Condition>
                            <Expression>
<Param><![CDATA["PERSONAL"]]></Param>
                            </Expression>
                            <Expression>
<Param><![CDATA["COMMON"]]></Param>
                            </Expression>
                        </Condition>
                        <ActionSet>
        <Action>
         <Expression>
           <Param><![CDATA[100%]]></Param>
         </Expression>
        </Action>
                        </ActionSet>
                    </Partition>
                    <Partition DefId="p2">
                        <Condition>
                            <Expression>
<Param><![CDATA["PERSONAL"]]></Param>
                            </Expression>
                            <Expression>
<Param><![CDATA["PLATINUM"]]></Param>
                            </Expression>
                        </Condition>
                        <ActionSet>
        <Action>
         <Expression>
           <Param><![CDATA[99%]]></Param>
         </Expression>
        </Action>
                        </ActionSet>
                    </Partition>
                </Partition>
                </Contents>
            </DecisionTable>
        </RuleList>
    </RuleGroup>
    <RuleGroup ExecutionMode="RetePlus" ExitCriteria="None"
Identifier="Local/Long-DistanceDimensionFeeCouponRuleGroup" Ordering="Default">
        <RuleList>
         <ActionRule>
            <definition><![CDATA[IF LOCAL
              THEN SET LOCAL/LONG-DISTANCE FEE AS FREE ;
              OTHERWISE SET LOCAL/LONG-DISTANCE FEE AS
'0.5%' ;]]></definition>
         </ActionRule>
        </RuleList>
    </RuleGroup>
  </Body>
</Ruleflow>
```

Illustration has been presented above to an example of generating a business rule model associated with calculating transfer fees. In one embodiment of the present invention, a corresponding business rule model may further be generated, according to the above method, from source code implementing other business flow. For example, a business rule model associated with calculating loan interest rates may be generated from the source code segment shown in FIG. 2.

In one embodiment of the present invention, there is further comprised: validating the business rule model on the basis of constraints between the business terms.

In this embodiment, whether there exists a potential error in existing source code may be judged with the assistance of the generated business rule model. Suppose business rules are generated as below from source code: 1) the interest rate of a deposit product is 2-10%, and no examination and approval is required; 2) the interest rate of a fixed-term deposit product must be subjected to examination and approval. At this point, it may be found that these two business rules might have a conflict. The fixed-term deposit product is a special type of deposit products, and when its rate is 2-10%, according to the business rule 1), this rate does not need examination and approval, while according to the business rule 2), the rate needs examination and approval. Then, a conflict arises.

Since COBOL is a procedure-oriented language that does not support a concept "inherit," different data structures need to be defined for representing different objects. Specifically, the fixed-term deposit product is a special type of deposit products; when an object-oriented programming language is used, the fixed-term deposit product may be defined as a subclass of deposit products. However, when using COBOL to write code, two data structures can only be defined according to syntactic regulations of a procedure-oriented language. At this point, the two data structures might have a conflict between them.

When developing an application system with a procedure-oriented language, since an inheritance relationship cannot be built between two separate data structures, it is difficult to find a potential error in source code. Using the technical solution of the present invention, a business rule model may be generated from source code, and further it can be judged whether a potential error exists in the source code by comparing rules in the model. In this manner, it may be validated whether the business rule model contains potential drawbacks. When any conflict is detected, it may be indicated by warning.

Various embodiments implementing the method of the present invention have been described above with reference to the accompanying drawings. Those skilled in the art may understand that the method may be implemented in software, hardware or a combination of software and hardware. Moreover, those skilled in the art may understand by implementing steps in the above method in software, hardware or a combination of software and hardware, there may be provided an apparatus based on the same invention concept. Even if the apparatus has the same hardware structure as a general-purpose processing device, the functionality of software contained therein makes the apparatus manifest distinguishing properties from the general-purpose processing device, thereby forming an apparatus of the various embodiments of the present invention. The apparatus described in the present invention comprises several means or modules, the means or modules configured to execute corresponding steps. Upon reading this specification, those skilled in the art may understand how to write a program for implementing actions performed by these means or modules. Since the apparatus is based on the same invention concept as the method, the same or corresponding implementation details are also applicable to means or modules corresponding to the method. As detailed and complete description has been presented above, the apparatus is not detailed below.

Figure 7:
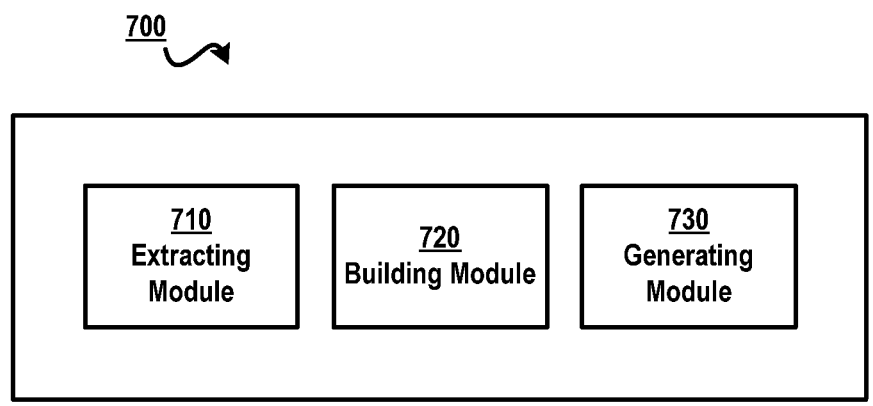
FIG. 7 schematically shows a block diagram of an apparatus for generating a business rule model according to one embodiment of the present invention.

FIG. 7 schematically shows a block diagram 700 of an apparatus for generating a business rule model. Specifically, there is provided an apparatus for generating a business rule model, comprising: an extracting module 710 configured to extract from source code of an application system a business flow executed by the source code, the business flow comprising a plurality of business procedures that are executed in an order; a building module 720 configured to analyze parts in the source code that are associated with various business procedures among the plurality of business procedures and build rule metadata describing business rules followed by various business procedures; and a generating module 730 configured to generate a business rule model followed by the business flow on the basis of the order and the rule metadata.

In one embodiment of the present invention, extracting module 710 comprises: a first extracting module configured to extract the business flow on the basis of logic procedures in the source code and an execution order among the logic procedures, wherein a business procedure in the business flow corresponds to a logic procedure in the source code.

In one embodiment of the present invention, building module 720 comprises: a first building module configured to, with respect to parts in the source code that are associated with various business procedures among the plurality of business procedures, build the rule metadata on the basis of a mapping relationship between a data structure referenced by the source code and a business term in the business flow.

In one embodiment of the present invention, the first building module comprises: a grouping module configured to identify an association relationship between the plurality of business procedures to divide the plurality of business procedures into at least one procedure group; and an analyzing module configured to analyze parts in the source code that are associated with various procedure groups of the at least one procedure group, and build rule metadata associated with the various procedure groups on the basis of the mapping relationship.

In one embodiment of the present invention, the analyzing module comprises: a lookup module configured to, with respect to a current procedure group of the at least one procedure group, look up an execution statement in a part of the source code corresponding to the current procedure group of the source code, so as to obtain a paragraph keyword; a locating module configured to locate a code paragraph on the basis of the paragraph keyword; and a parsing module configured to parse the code paragraph on the basis of a mapping relationship so as to obtain the rule metadata.

In one embodiment of the present invention, the parsing module comprises: an obtaining module configured to obtain from the code paragraph a conditional statement and an action statement corresponding to the conditional statement; and a forming module configured to, in response to existence of the mapping relationship between the conditional statement and the business term, form the rule metadata on the basis of the conditional statement and the action statement.

In one embodiment of the present invention, there is further comprised: a validating module configured to validate the business rule model on the basis of constraints between the business terms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for generating a business rule model by a data processing system, comprising:
    the data processing system having a processor extracting from source code of an application system a business flow executed by the source code, the business flow comprising a plurality of business procedures that are executed in an order;
    the data processing system having a processor analyzing parts in the source code that are associated with various business procedures among the plurality of business procedures;
    the data processing system having a processor building rule metadata describing business rules followed by the various business procedures using the parts in the source code that are associated with the various business procedures; and
    the data processing system having a processor generating a business rule model followed by the business flow on the basis of the order of execution of the plurality of business procedures and the rule metadata describing the business rules followed by the various business procedures, wherein the method for generating the business rule model represents a technological improvement to computer technology by improving extraction of business logic, in the form of business rules, from hard coded legacy code.

2. The method according to claim 1, wherein the extracting from source code of the application system the business flow executed by the source code comprises:

the data processing system extracting the business flow on the basis of logic procedures in the source code and an execution order among the logic procedures, wherein a business procedure in the business flow corresponds to a logic procedure in the source code.

3. The method according to claim 1, wherein the analyzing parts in the source code that are associated with various business procedures among the plurality of business procedures and building the rule metadata describing business rules followed by the various business procedures comprises:

the data processing system building the rule metadata on the basis of a mapping relationship between a data structure referenced by the source code and a business term in the business flow with respect to parts in the source code that are associated with various business procedures among the plurality of business procedures.

4. The method according to claim 3, wherein the building the rule metadata on the basis of a mapping relationship between a data structure referenced by the source code and a business term in the business flow with respect to parts in the source code that are associated with various business procedures among the plurality of business procedures comprises:

the data processing system identifying an association relationship between the plurality of business procedures to divide the plurality of business procedures into at least one procedure group; and the data processing system analyzing the parts in the source code that are associated with various procedure groups of the at least one procedure group, and building rule metadata associated with the various procedure groups on the basis of the mapping relationship, wherein the business rule model is generated utilizing XPath expression based expressions and annotations.

5. The method according to claim 4, wherein the analyzing the parts in the source code that are associated with various procedure groups of the at least one procedure group and building rule metadata associated with the various procedure groups on the basis of the mapping relationship comprises: with respect to a current procedure group of the at least one procedure group, the data processing system looking up an execution statement in a part of the source code corresponding to the current procedure group of the source code, so as to obtain a paragraph keyword;

the data processing system locating a code paragraph on the basis of the paragraph keyword; and the data processing system parsing the code paragraph on the basis of the mapping relationship so as to obtain the rule metadata.

6. The method according to claim 5, wherein the parsing the code paragraph on the basis of a mapping relationship so as to obtain the rule metadata comprises:

the data processing system obtaining from the code paragraph a conditional statement and an action statement corresponding to the conditional statement; and the data processing system, in response to existence of the mapping relationship between the conditional statement and the business term, forming the rule metadata on the basis of the conditional statement and the action statement.

7. The method according to claim 3, further comprising:
the data processing system validating the business rule model on the basis of constraints between the business terms.

8. An apparatus for generating a business rule model, comprising:

an extracting module executed by said computer processor configured to extract from source code of an application system a business flow executed by the source code, the business flow comprising a plurality of business procedures that are executed in an order;

a building module executed by said computer processor configured to analyze parts in the source code that are associated with various business procedures among the plurality of business procedures and to build rule metadata describing business rules followed by the various business procedures using the parts in the source code that are associated with the various business procedures; and a generating module executed by said computer processor configured to generate a business rule model followed by the business flow on the basis of the order of execution of the plurality of business procedures and the rule metadata describing the business rules followed by the various business procedures, wherein the apparatus for generating the business rule model represents a technological improvement to computer technology by improving extraction of business logic, in the form of business rules, from hard coded legacy code.

9. The apparatus according to claim 8, wherein the extracting module comprises:

a first extracting module configured to extract the business flow on the basis of logic procedures in the source code and an execution order among the logic procedures, wherein a business procedure in the business flow corresponds to a logic procedure in the source code.

10. The apparatus according to claim 8, wherein the building module comprises:

a first building module configured to, with respect to parts in the source code that are associated with various business procedures among the plurality of business procedures, build the rule metadata on the basis of a mapping relationship between a data structure referenced by the source code and a business term in the business flow.

11. The apparatus according to claim 10, wherein the first building module comprises:

a grouping module configured to identify an association relationship between the plurality of business procedures to divide the plurality of business procedures into at least one procedure group; and an analyzing module configured to analyze the parts in the source code that are associated with various procedure groups of the at least one procedure group, and building rule metadata associated with the various procedure groups on the basis of the mapping relationship, wherein the generating module is configured to generate a business rule model utilizing XPath expression based expressions and annotations.

12. The apparatus according to claim 11, wherein the analyzing module comprises:

a lookup module configured to, with respect to a current procedure group of the at least one procedure group, look up an execution statement in a part of the source code corresponding to the current procedure group of the source code, so as to obtain a paragraph keyword;

a locating module configured to locate a code paragraph on the basis of the paragraph keyword; and a parsing module configured to parse the code paragraph on the basis of the mapping relationship so as to obtain the rule metadata.

13. The apparatus according to claim 12, wherein the parsing module comprises:

an obtaining module configured to obtain from the code paragraph a conditional statement and an action statement corresponding to the conditional statement; and a forming module configured to, in response to existence of the mapping relationship between the conditional statement and the business term, form the rule metadata on the basis of the conditional statement and the action statement.

14. The apparatus according to claim 10, further comprising:

a validating module configured to validate the business rule model on the basis of constraints between the business terms.

15. A computer program product comprising a non-transitory computer readable storage medium embodying program instructions configured to cause a computing system having a processor to perform the method according to claim 1 when the computer program is executed on the computing system.

* * * * *